(12) United States Patent
Vazquez

(10) Patent No.: US 11,133,122 B2
(45) Date of Patent: Sep. 28, 2021

(54) MAGNETIC ANCHORING DEVICES

(71) Applicant: Paul Victor Vazquez, Hardy, VA (US)

(72) Inventor: Paul Victor Vazquez, Hardy, VA (US)

(*) Notice: Subject to any disclaimer, the term of this patent is extended or adjusted under 35 U.S.C. 154(b) by 0 days.

(21) Appl. No.: 16/928,285

(22) Filed: Jul. 14, 2020

(65) Prior Publication Data

US 2021/0020344 A1 Jan. 21, 2021

Related U.S. Application Data

(60) Provisional application No. 62/874,009, filed on Jul. 15, 2019.

(51) Int. Cl.
| | |
|---|---|
| *H01F 7/02* | (2006.01) |
| *A41F 1/00* | (2006.01) |
| *A44B 11/00* | (2006.01) |
| *F16B 1/00* | (2006.01) |

(52) U.S. Cl.
CPC ............ *H01F 7/0221* (2013.01); *A41F 1/002* (2013.01); *A44B 11/00* (2013.01); *A44D 2203/00* (2013.01); *F16B 2001/0035* (2013.01)

(58) Field of Classification Search
CPC ........... F16B 2001/0035; H01F 7/0221; A44D 2203/00; Y10T 24/32; Y10T 24/31; Y10T 24/318
See application file for complete search history.

(56) References Cited

U.S. PATENT DOCUMENTS

| | | | |
|---|---|---|---|
| 3,124,725 A | | 3/1964 | Legullon |
| 5,604,960 A | | 2/1997 | Good |
| 7,187,261 B2 | | 3/2007 | Cassar |
| 8,523,149 B1 | | 9/2013 | Novak |
| 9,420,856 B2 | * | 8/2016 | Proud ..................... G06F 1/163 |
| 9,914,615 B2 | | 3/2018 | Wooldridge et al. |
| 2001/0055666 A1 | | 12/2001 | Lee et al. |
| 2018/0281660 A1 | * | 10/2018 | Dahlin ...................... F16B 1/00 |
| 2018/0368602 A1 | * | 12/2018 | Albanese ............... A44B 99/00 |
| 2019/0183423 A1 | * | 6/2019 | Radivojevic ....... A45C 13/1069 |
| 2019/0350318 A1 | * | 11/2019 | Levine ................... A44B 99/00 |

* cited by examiner

*Primary Examiner* — Robert Sandy
(74) *Attorney, Agent, or Firm* — Dinsmore & Shohl LLP; Matthew D. Epstein

(57) ABSTRACT

A magnetic anchoring device for securing an object onto a ferromagnetic object or support structure. The magnetic anchoring device includes a flexible member having a first end, an opposite second end, a front surface, and an opposite rear surface, the first end, the second end, the front surface, and the rear surface defining an open interior, a first magnet positioned within the open interior of the flexible member and proximate the first end, and a second magnet positioned within the open interior of the flexible member and proximate the second end. In some embodiments, the magnetic anchoring device includes a third magnet positioned within the open interior of the flexible member between the first magnet and the second magnet. In some embodiments, the second magnet is an elongated member and the first magnet is slidably adjustable along the second magnet.

20 Claims, 5 Drawing Sheets

MAGNETIC ANCHORING DEVICES

CROSS-REFERENCE TO RELATED APPLICATION

This application claims priority to U.S. Provisional Patent Application No. 62/874,009, filed Jul. 15, 2019, for "Magnetic Anchoring Device," which is hereby incorporated by reference in its entirety including the drawings.

TECHNICAL FIELD

The present specification generally relates to devices for hanging objects and, more specifically, magnetic fastener loops that permit an object to be hung on a metal surface or wrapped around a non-metal surface.

BACKGROUND

It is has been known to use devices that may be suitable for hanging an object on a metallic or non-metallic surfaces. However, these devices fall short by failing to provide the minimalist, yet highly functional, structure disclosed in the present disclosure. In addition, these devices are not adjustable to secure objects of different sizes and geometries.

Accordingly, a need exists for improved hanging devices that are equipped to adjust to objects of varying sizes and provide a strong attachment on both metallic and non-metallic support structures.

SUMMARY

In one embodiment, a magnetic anchoring device for hanging an object onto a ferromagnetic surface or a support structure includes a flexible member having a first end, an opposite second end, a first surface, and an opposite second surface, the first end, the second end, the first surface, and the second surface defining an open interior, a first magnet positioned within the open interior of the flexible member and proximate the first end, and a second magnet positioned within the open interior of the flexible member and proximate the second end.

In another embodiment, a magnetic anchoring device for hanging an object onto a ferromagnetic surface or a support structure includes a flexible member having a first end, an opposite second end, a first surface, and an opposite second surface, the first end, the second end, the first surface, and the second surface defining an open interior, a first magnet positioned within the open interior of the flexible member and proximate the first end, and a second magnet positioned within the open interior of the flexible member and proximate the second end. The flexible member is positionable between a non-use position in which the first magnet is not magnetically attached to any portion of the flexible member, and a use position in which the first magnet is magnetically attached to a portion of the flexible member to create a loop.

In some embodiments, the magnetic anchoring device includes a third magnet positioned within the open interior of the flexible member between the first magnet and the second magnet. At least one of the first magnet and the second magnet may be attached to the third magnet for creating at least one loop to secure an object to a support structure.

In some embodiments, the second magnet is an elongated member and the first magnet is slidably adjustable along the second magnet. This allows for a loop having an adjustable size to be created between the first magnet and the second magnet.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
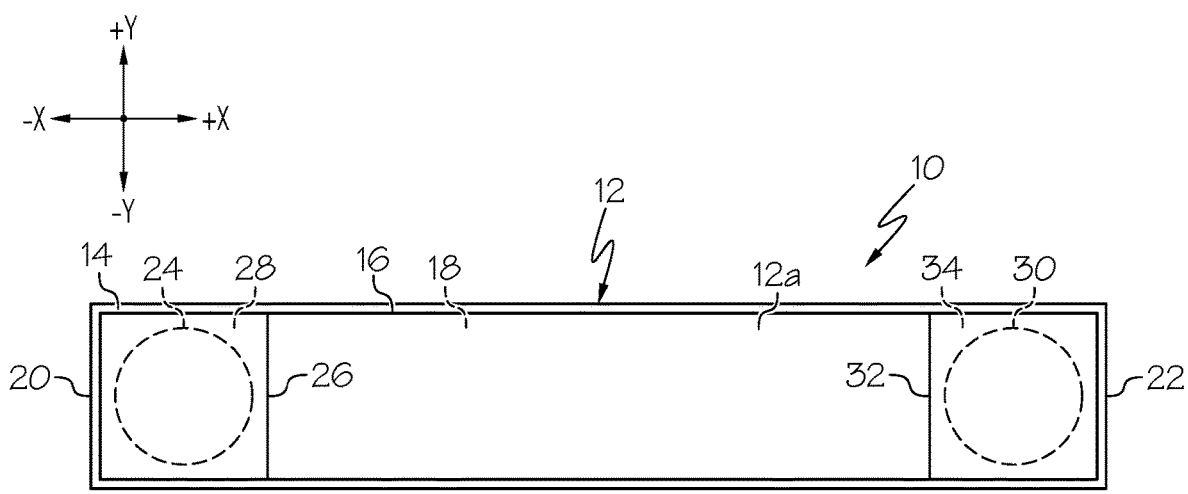
FIG. 1 schematically depicts a top plan view of a magnetic anchoring device according to one or more embodiments shown and described herein.

Embodiments described herein are directed to a magnetic anchoring device for securing an object onto a ferromagnetic object or support structure. The magnetic anchoring device includes a flexible member having a first end, an opposite second end, and an open interior, a first magnet positioned within the open interior of the flexible member and proximate the first end, and a second magnet positioned within the open interior of the flexible member and proximate the second end. Various embodiments of the magnetic anchoring device and the operation of the magnetic anchoring device are described in more detail herein. Whenever possible, the same reference numerals will be used throughout the drawings to refer to the same or like parts.

Figure 2:
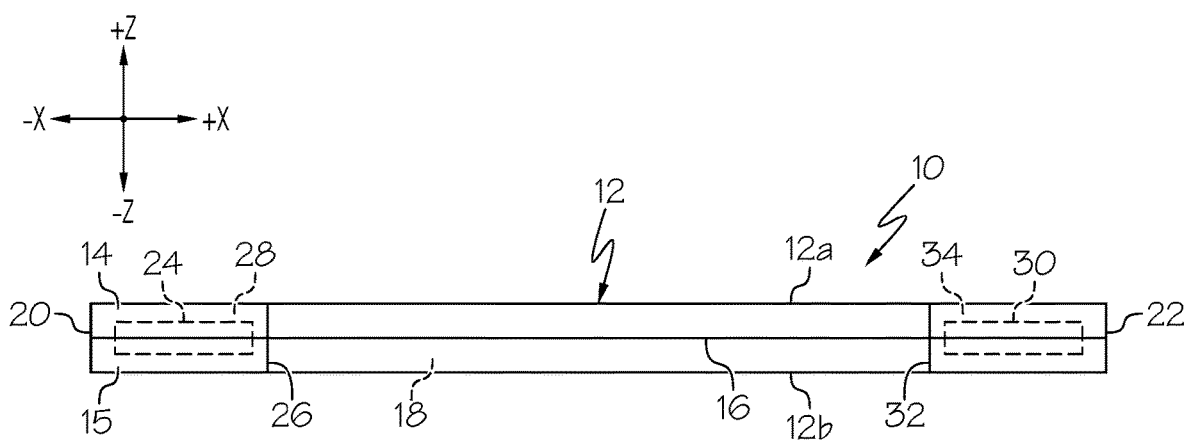
FIG. 2 schematically depicts a side view of the magnetic anchoring device of FIG. 1 according to one or more embodiments shown and described herein.

Referring now to FIGS. 1 and 2, a magnetic anchoring device 10 is illustrated in a non-use position according to one or more embodiments described herein. The magnetic anchoring device 10 may generally include a flexible member 12 having at least at least a partially open interior 18. The flexible member 12 may be formed from a deformable and bendable material such as, for example, plastic, woven and nonwoven fabric, rubber, or the like. In some embodiments, the flexible member 12 is a one-piece, monolithic structure having a front surface 12a and a back surface 12b. The open interior 18 is defined by the front surface 12a and the back surface 12b. In some embodiments, the flexible member 12 is formed from a separate front sheet 14 and an opposite back sheet 15 defining the front surface 12a and the back surface 12b, respectively. The front sheet 14 and the back sheet 15 are joined at a perimetral edge 16 in any suitable manner such as, for example, sewing, adhesive, ultrasonic welding, or the like. The flexible member 12 includes a first end 20 and an opposite second end 22.

The magnetic anchoring device 10 may also include a first magnet 24 and a second magnet 30. In the non-use position, the first magnet 24 is not magnetically attached to the second magnet 30. The first magnet 24 is positioned between the front sheet 14 and the back sheet 15 proximate the first end 20 of the flexible member 12. In some embodiments, the first magnet 24 may be positioned at a first end portion that is adjacent to the first end 20 of the flexible member 12. As discussed herein, the first magnet 24 is secured within a first pocket 28 formed by joining the front sheet 14 and the back sheet 15 together at a first joint 26, thereby creating the first pocket 28 for the first magnet 24. In some embodiments, the first magnet 24 is loosely secured within the first pocket 28, such that the first magnet 24 can move within the first pocket 28. In some embodiments, the first pocket 28 may be formed by folding a portion of the front sheet 14 onto itself, thereby eliminating the need for the back sheet 15.

The second magnet 30 is also positioned between the front sheet 14 and the back sheet 15 proximate the second end 22 of the flexible member 12. In some embodiments, the second magnet 30 may be positioned at a second end portion that is adjacent to the second end 22 of the flexible member 12. The second magnet 30 is secured within a second pocket 34 formed by joining the front sheet 14 and the back sheet 15 together at a second joint 32, thereby creating the second pocket 34 for the second magnet 30. In some embodiments, the second magnet 30 may be loosely secured within the second pocket 34, such that the second magnet 30 can move within the second pocket 34. In some embodiments, the second pocket 34 may be formed by folding a portion of the front sheet 14 onto itself, thereby eliminating the need for the back sheet 15. The first joint 26 and the second joint 32 may be a joint formed in any suitable manner such as, for example, sewing, adhesive, ultrasonic welding, or the like.

As depicted herein, the first magnet 24 and the second magnet 30 each have a generally circular outer peripheral shape. However, in embodiments, the first magnet 24 and the second magnet 30 may have any suitable geometry, such as square, rectangular, star-shaped, or the like. In some embodiments, the first magnet 24 and the second magnet 30 have the same geometry and are identical to one another. In some embodiments, the first magnet 24 and the second magnet 30 have a different geometry and/or size than one another.

Figure 3:
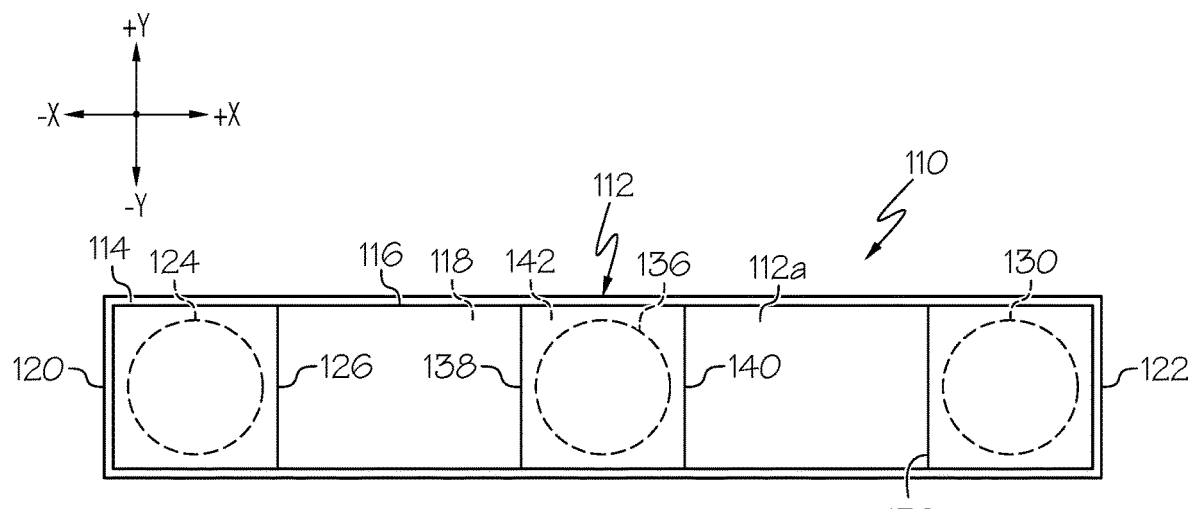
FIG. 3 schematically depicts a top plan view of a magnetic anchoring device according to one or more embodiments shown and described herein.
Figure 4:
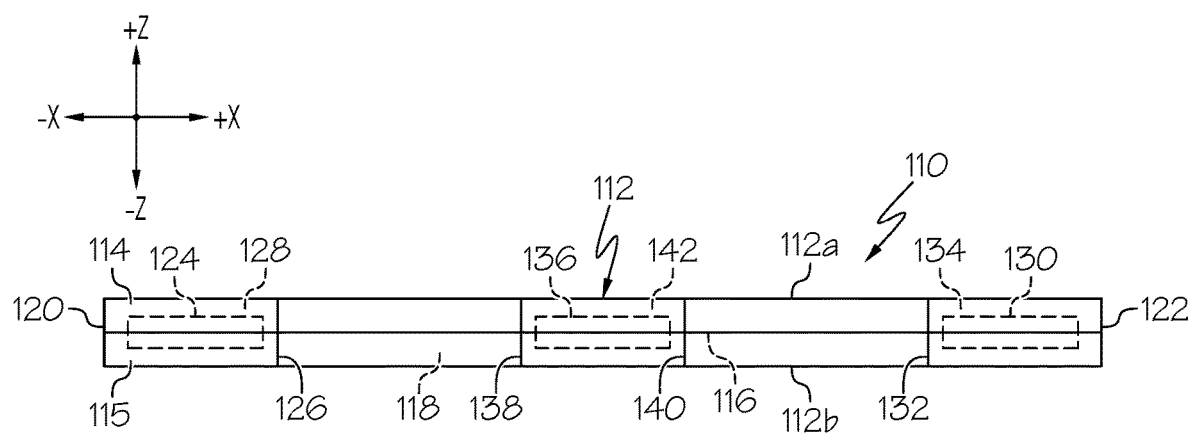
FIG. 4 schematically depicts a side view of the magnetic anchoring device of FIG. 3 according to one or more embodiments shown and described herein.

Referring now to FIGS. 3 and 4, a magnetic anchoring device 110 is illustrated in a non-use position according to one or more embodiments described herein. The magnetic anchoring device 110 may generally include a flexible member 112 having at least at least a partially open interior 118. The flexible member 112 may be formed from a deformable and bendable material such as, for example, plastic, woven and nonwoven fabric, rubber, or the like. In some embodiments, the flexible member 112 is a one-piece, monolithic structure having a front surface 112a and a back surface 112b. The open interior 118 is defined by the front surface 112a and the back surface 112b. In some embodiments, the flexible member 112 is formed from a separate front sheet 114 and an opposite back sheet 115 defining the front surface 112a and the back surface 112b, respectively. The front sheet 114 and the back sheet 115 are joined at a perimetral edge 116 in any suitable manner such as, for example, sewing, adhesive, ultrasonic welding, or the like. The flexible member 112 includes a first end 120 and an opposite second end 122.

The magnetic anchoring device 110 may also include a first magnet 124 and a second magnet 130. The first magnet 124 is positioned between the front sheet 114 and the back sheet 115 proximate the first end 120 of the flexible member 112. In some embodiments, the first magnet 124 may be positioned at a first end portion that is adjacent to the first end 120 of the flexible member 112. As discussed herein, the first magnet 124 is secured within a first pocket 128 formed by joining the front sheet 114 and the back sheet 115 together at a first joint 126, thereby creating the first pocket 128 for the first magnet 124. In some embodiments, the first magnet 124 is loosely secured within the first pocket 128, such that the first magnet 124 can move within the first pocket 128. In some embodiments, the first pocket 128 may be formed by folding a portion of the front sheet 114 onto itself, thereby eliminating the need for the back sheet 115.

The second magnet 130 is also positioned between the front sheet 114 and the back sheet 115 proximate the second end 122 of the flexible member 112. In some embodiments, the second magnet 130 may be positioned at a second end portion that is adjacent to the second end 122 of the flexible member 112. The second magnet 130 is secured within a second pocket 134 formed by joining the front sheet 114 and the back sheet 115 together at a second joint 132, thereby creating the second pocket 134 for the second magnet 130. In some embodiments, the second magnet 130 may be loosely secured within the second pocket 134, such that the second magnet 130 can move within the second pocket 134. In some embodiments, the second pocket 134 may be formed by folding a portion of the front sheet 114 onto itself, thereby eliminating the need for the back sheet 115.

The magnetic anchoring device 110 includes a third magnet 136. In the non-use position, the first magnet 124 is not magnetically attached to the third magnet 136. The third magnet 136 is positioned between the front sheet 114 and the back sheet 115 at a substantially medial portion of the flexible member 112 between the first magnet 124 and the second magnet 130. In some embodiments, the third magnet 136 is loosely secured within the open interior 118 by joining the front sheet 114 and the back sheet 115 together, at a third joint 138 and an opposite fourth joint 140, thereby creating a third pocket 142 for the third magnet 136. In other embodiments, the third magnet 136 is free to slide or move within the open interior 118 between the first joint 126 and the second joint 132. In embodiments in which the front sheet 114 is folded onto itself to form the first pocket 128 and the second pocket 134, a separate sheet may be secured to the front sheet 114 at the substantially medial portion to form the third pocket 142 in which the third magnet 136 is positioned. The first joint 126, the second joint 132, the third joint 138, and the fourth joint 140 may be a joint formed in any suitable manner such as, for example, sewing, adhesive, ultrasonic welding, or the like.

As depicted herein, the first magnet 124, the second magnet 130, and the third magnet 136 each have a generally circular outer peripheral shape. However, in embodiments, the first magnet 124, the second magnet 130, and the third magnet 136 may have any suitable geometry, such as square, rectangular, star-shaped, or the like. In some embodiments, the first magnet 124, the second magnet 130, and the third magnet 136 have the same geometry and are identical to one another. In some embodiments, the first magnet 124, the second magnet 130, and the third magnet 136 have a different geometry and/or size than one another.

Figure 5:
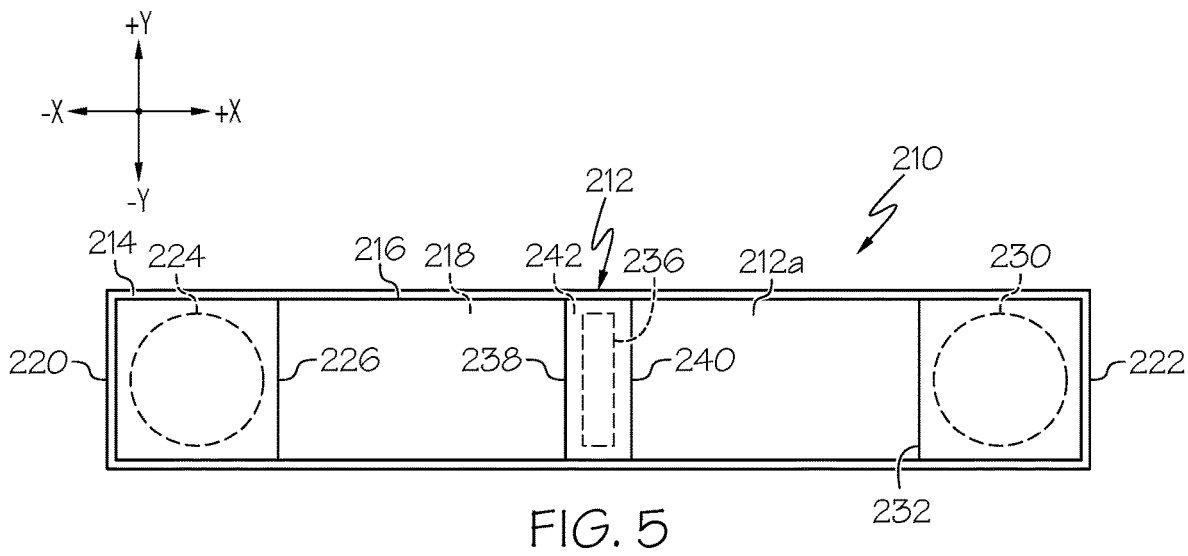
FIG. 5 schematically depicts a top plan view of a magnetic anchoring device according to one or more embodiments shown and described herein.
Figure 6:
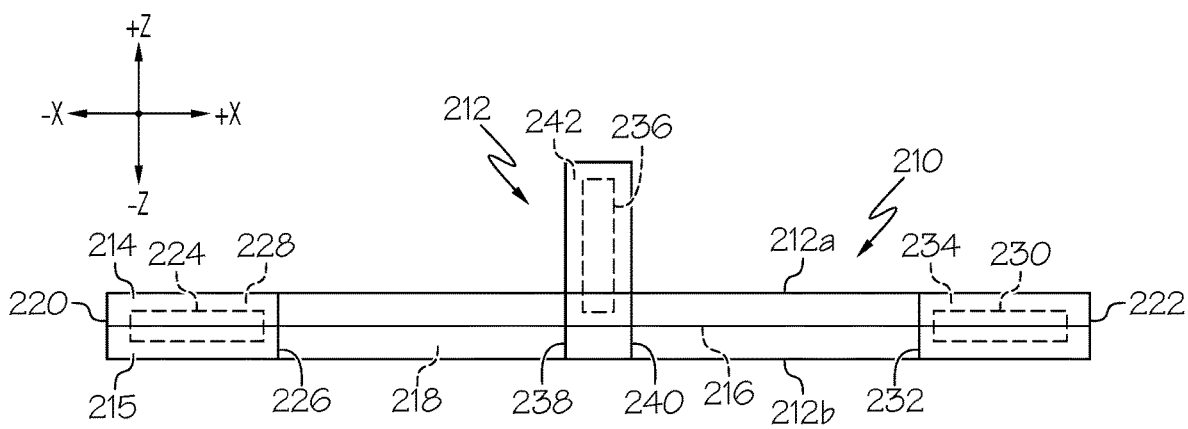
FIG. 6 schematically depicts a side view of the magnetic anchoring device of FIG. 5 according to one or more embodiments shown and described herein.
Figure 7:
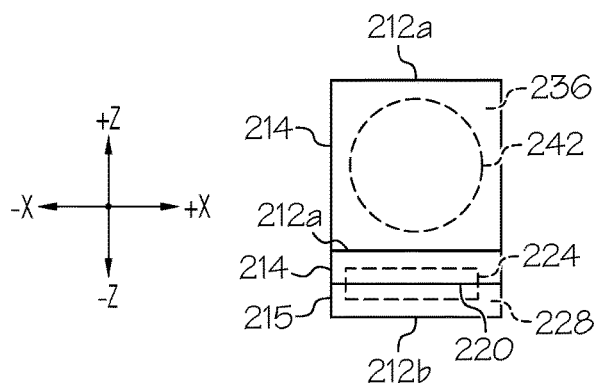
FIG. 7 schematically depicts an end view of the magnetic anchoring device of FIG. 5 according to one or more embodiments shown and described herein.

Referring now to FIGS. 5-7, a magnetic anchoring device 210 is illustrated in a non-use position according to one or more embodiments described herein. The magnetic anchoring device 210 may generally include a flexible member 212 having at least at least a partially open interior 218. The flexible member 212 may be formed from a deformable and bendable material such as, for example, plastic, woven and nonwoven fabric, rubber, or the like. In some embodiments, the flexible member 212 is a one-piece, monolithic structure having a front surface 212a and a back surface 212b. The open interior 118 is defined by the front surface 212a and the back surface 212b. In some embodiments, the flexible member 212 is formed from a separate front sheet 214 and an opposite back sheet 215 defining the front surface 212a and the back surface 212b, respectively. The front sheet 214 and the back sheet 215 are joined at a perimetral edge 216 in any suitable manner such as, for example, sewing, adhesive, ultrasonic welding, or the like. The flexible member 212 includes a first end 220 and an opposite second end 222.

The magnetic anchoring device 210 may also include a first magnet 224 and a second magnet 230. The first magnet 224 is positioned between the front sheet 214 and the back sheet 215 proximate the first end 220 of the flexible member 212. In some embodiments, the first magnet 224 may be positioned at a first end portion that is adjacent to the first end 220 of the flexible member 212. As discussed herein, the first magnet 224 is secured within a first pocket 228 formed by joining the front sheet 214 and the back sheet 215 together at a first joint 226, thereby creating the first pocket 228 for the first magnet 224. In some embodiments, the first magnet 224 is loosely secured within the first pocket 228, such that the first magnet 224 can move within the first pocket 228. In some embodiments, the first pocket 228 may be formed by folding a portion of the front sheet 214 onto itself, thereby eliminating the need for the back sheet 215.

The second magnet 230 is also positioned between the front sheet 214 and the back sheet 215 proximate the second end 222 of the flexible member 212. In some embodiments, the second magnet 230 may be positioned at a second end portion that is adjacent to the second end 222 of the flexible member 212. The second magnet 230 is secured within a second pocket 234 formed by joining the front sheet 214 and the back sheet 215 together at a second joint 232, thereby creating the second pocket 234 for the second magnet 230. In some embodiments, the second magnet 230 may be loosely secured within the second pocket 234, such that the second magnet 230 can move within the second pocket 234. In some embodiments, the second pocket 234 may be formed by folding a portion of the front sheet 214 onto itself, thereby eliminating the need for the back sheet 215.

The magnetic anchoring device 210 includes a third magnet 236. In the non-use position, the first magnet 224 is not magnetically attached to the third magnet 236. The third magnet 236 is positioned between the front sheet 214 and the back sheet 215 at a substantially medial portion of the flexible member 212 between the first magnet 224 and the second magnet 230. In some embodiments, the third magnet 236 is loosely secured within the open interior 218 by joining the front sheet 214 and the back sheet 215 together, at a third joint 238 and an opposite fourth joint 240, thereby creating a third pocket 242 for the third magnet 236. In other embodiments, the third magnet 236 is free to slide or move within the open interior 218 between the first joint 226 and the second joint 232. The magnetic anchoring device 210 differs from the magnetic anchoring device 110 in that the third packet 236 is arranged perpendicular to the first magnet 224 and the second magnet 230 when in the non-use position and the magnetic anchoring device 210 is substantially planar. Thus, in some embodiments, the amount of material provided by the front sheet 214 between the third joint 238 and the fourth joint 240 is greater than the amount of material provided by the back sheet 215 between the third joint 238 and the fourth joint 240 to allow enough space for the third pocket 242 to receive the third magnet 236. In embodiments in which the front sheet 214 is folded onto itself to form the first pocket 228 and the second pocket 234, a separate sheet may be secured to the front sheet 214 at the substantially medial portion to form the third pocket 242 in which the third magnet 236 is positioned. The first joint 226, the second joint 232, the third joint 238, and the fourth joint 240 may be a joint formed in any suitable manner such as, for example, sewing, adhesive, ultrasonic welding, or the like.

As depicted herein, the first magnet 224, the second magnet 230, and the third magnet 236 each have a generally circular outer peripheral shape. However, in embodiments, the first magnet 224, the second magnet 230, and the third magnet 236 may have any suitable geometry, such as square, rectangular, star-shaped, or the like. In some embodiments, the first magnet 224, the second magnet 230, and the third magnet 236 have the same geometry and are identical to one another. In some embodiments, the first magnet 224, the second magnet 230, and the third magnet 236 have a different geometry and/or size than one another.

Figure 8:
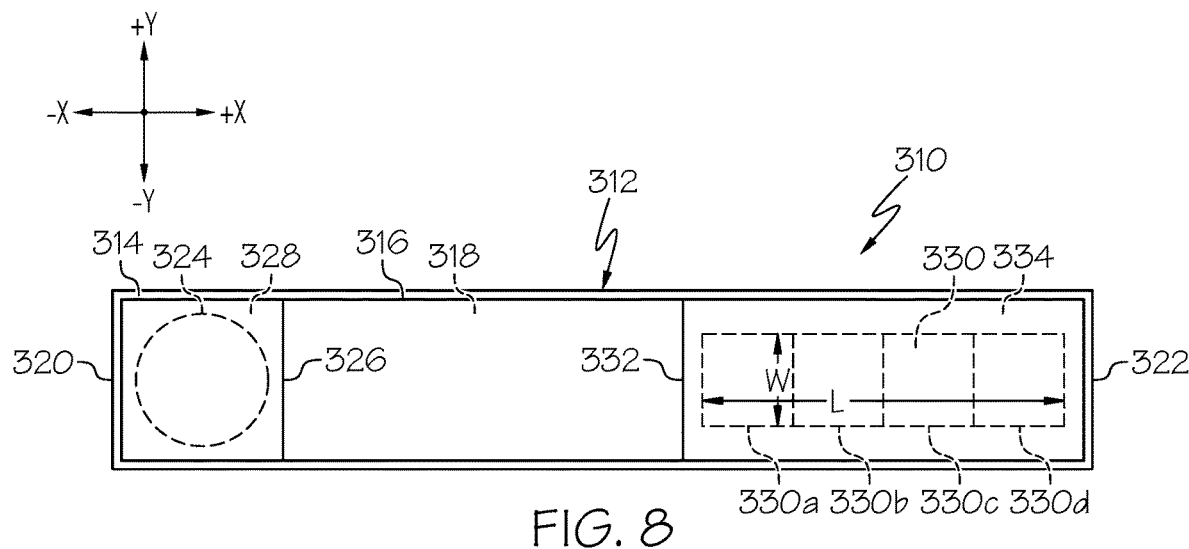
FIG. 8 schematically depicts a top plan view of a magnetic anchoring device according to one or more embodiments shown and described herein.
Figure 9:
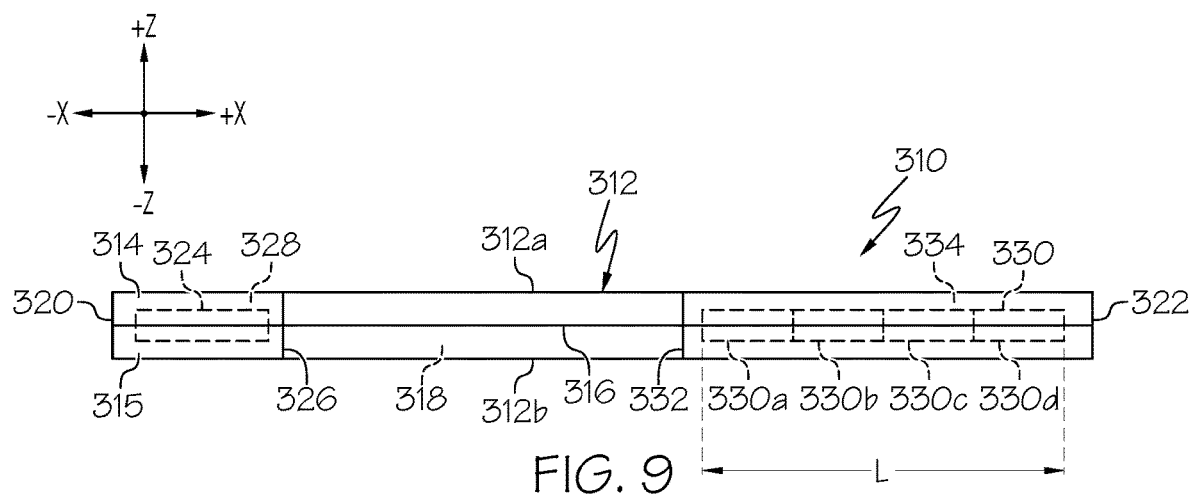
FIG. 9 schematically depicts a side view of the magnetic anchoring device of FIG. 8 according to one or more embodiments shown and described herein.

Referring now to FIGS. 8 and 9, a magnetic anchoring device 310 is illustrated in a non-use position according to one or more embodiments described herein. The magnetic anchoring device 310 may generally include a flexible member 312 having at least at least a partially open interior 318. The flexible member 312 may be formed from a deformable and bendable material such as, for example, plastic, woven and nonwoven fabric, rubber, or the like. In some embodiments, the flexible member 312 is a one-piece, monolithic structure having a front surface 312a and a back surface 312b. The open interior 318 is defined by the front surface 312a and the back surface 312b. In some embodiments, the flexible member 312 is formed from a separate front sheet 314 and an opposite back sheet 215 defining the front surface 312a and the back surface 312b, respectively. The front sheet 314 and the back sheet 315 are joined at a perimetral edge 316 in any suitable manner such as, for example, sewing, adhesive, ultrasonic welding, or the like. The flexible member 312 includes a first end 320 and an opposite second end 322.

The magnetic anchoring device 310 may also include a first magnet 324 and a second magnet 330. In the non-use position, the first magnet 324 is not magnetically attached to the second magnet 330. The first magnet 324 is positioned between the front sheet 314 and the back sheet 315 proximate the first end 320 of the flexible member 312. In some embodiments, the first magnet 324 may be positioned at a first end portion that is adjacent to the first end 320 of the flexible member 312. As discussed herein, the first magnet 324 is secured within a first pocket 328 formed by joining the front sheet 314 and the back sheet 315 together at a first joint 326, thereby creating the first pocket 328 for the first magnet 324. In some embodiments, the first magnet 324 is loosely secured within the first pocket 328, such that the first magnet 324 can move within the first pocket 328. In some embodiments, the first pocket 328 may be formed by folding a portion of the front sheet 314 onto itself, thereby eliminating the need for the back sheet 315.

The second magnet 330 is also positioned between the front sheet 314 and the back sheet 315 proximate the second end 322 of the flexible member 312. In some embodiments, the second magnet 330 may be positioned at a second end portion that is adjacent to the second end 322 of the flexible member 312. The second magnet 330 is secured within a second pocket 334 formed by joining the front sheet 314 and the back sheet 315 together at a second joint 332, thereby creating the second pocket 334 for the second magnet 330. In some embodiments, the second magnet 330 may be loosely secured within the second pocket 334, such that the second magnet 330 can move within the second pocket 334. In some embodiments, the second magnet 330 is an elongated magnet having a length L extending along an axis between the first end 320 and the second end 322 of the flexible member 312, and a width W transverse to the length L. The second magnet 330 has a length L greater than the width W. In some embodiments, the second magnet 330 comprises a plurality of individual magnet segments 330*a*, 330*b*, 330*c*, 330*d* spanning the length L, which is greater than the width W. In some embodiments, the second pocket 334 may be formed by folding a portion of the front sheet 314 onto itself, thereby eliminating the need for the back sheet 315. The first joint 326 and the second joint 332 may be a joint formed in any suitable manner such as, for example, sewing, adhesive, ultrasonic welding, or the like.

As depicted herein, the first magnet 324 has a generally circular outer peripheral shape and the second magnet 330 has a rectangular geometry. However, in embodiments, the first magnet 324 and the second magnet 330 may have any suitable geometry, such as square, rectangular, star-shaped, or the like. Further, the magnet segments 330*a*, 330*b*, 330*c*, 330*d* may have any suitable geometry as well and may have the same shape and/or geometry as the first magnet 324. In some embodiments, the magnet segments 330*a*, 330*b*, 330*c*, 330*d* have a different geometry and/or size than the first magnet 24. Further, the magnet segments 330*a*, 330*b*, 330*c*, 330*d* may each have the same geometry and/or shape, or may have a different geometry and/or shape.

Figure 10:
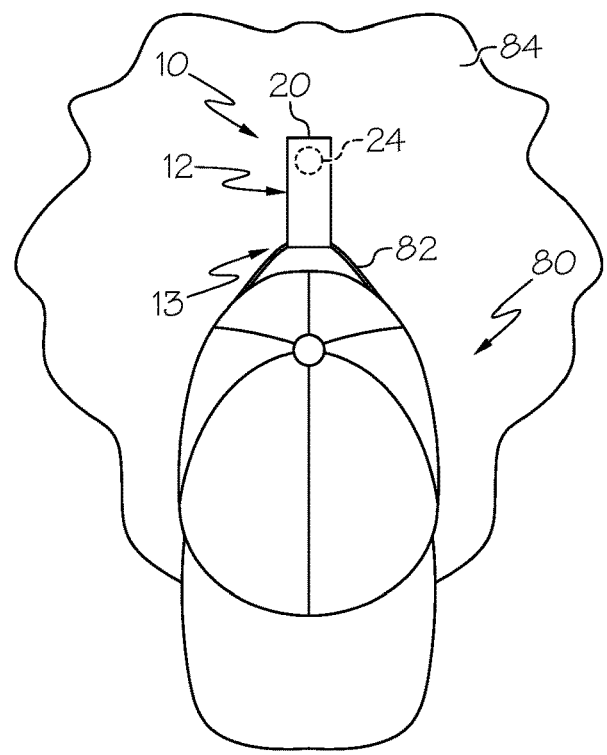
FIG. 10 schematically depicts a front view of the magnetic anchoring device of FIG. 1 in a use position according to one or more embodiments shown and described herein.

Referring now to FIG. 10, and with reference to FIGS. 1 and 2, the anchoring device 10 is shown in a use position in which the first magnet 24 and the second magnet 30 are magnetically attached to one another. As shown, when in the use position, the flexible member 12 is inserted through an attachment portion such as a strap 82 of an article such as a hat 80 for hanging the hat 80 on a ferromagnetic surface 84. As such, the first magnet 24 and the second magnet 30 are joined together to create a loop 13 through which the strap 82 of the hat 80 extends. The loop 13 is defined by bending the flexible member 12 such that a portion of the front surface 12*a* faces an adjacent portion of the front surface 12*a* or, alternatively, a portion of the back surface 12*b* faces an adjacent portion of the back surface 12*b*, depending on in which direction the flexible member 12 is folded. Either the first magnet 24 or the second magnet 30 can then be attached to the ferromagnetic surface 84 to hang the hat 80 thereto.

It is to be understood that the hat 80 is only shown for illustrative purposes only and the anchoring device 10 may be used for hanging any suitable object onto a ferromagnetic surface.

It should be appreciated that the anchoring device 310, as shown in FIGS. 8 and 9, may be used in a similar manner to hang an object, such as the hat 80. More particularly, the second magnet 330 provides the ability to slidably adjust the size of the loop created by bending the flexible member 312 having a length extending along the flexible member 312 between the first magnet 324 and the second magnet 330 by sliding the first magnet 324 along the length L direction of the second magnet 330. This increases or decreases the size of the loop to create a more secure fit around the object or a portion of the object, such as the strap 82 of the hat 80, being hung.

Figure 11:
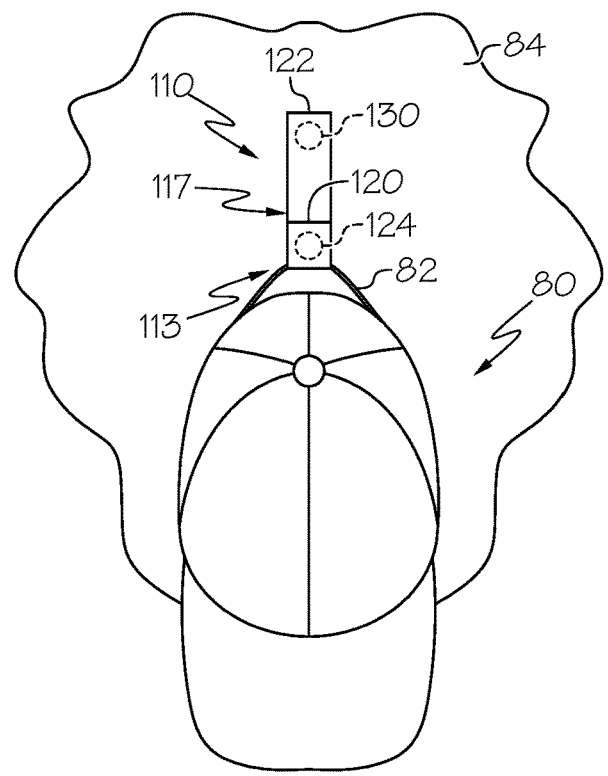
FIG. 11 schematically depicts a front view of the magnetic anchoring device of FIG. 3 in a use position according to one or more embodiments shown and described herein.

Referring now to FIG. 11, and with reference to FIGS. 3 and 4, the anchoring device 110 is shown in a use position in which the first magnet 124 and the third magnet 136 are magnetically attached to one another. As shown, when in the use position, the flexible member 112 is inserted through the strap 82 of the hat 80 for hanging the hat 80 on the ferromagnetic surface 84. Here, the first magnet 124 is attached to the third magnet 136 to create a loop 113 through which the strap 82 of the hat 80 extends. The loop 113 is defined by bending the flexible member 112 such that a portion of the front surface 112*a* faces an adjacent portion of the front surface 112*a* or, alternatively, a portion of the back surface 112*b* faces an adjacent portion of the back surface 112*b*, depending on in which direction the flexible member 112 is folded. The size of the loop 113 may be adjusted based on how far or how close the third magnet 136 is moved toward the first joint 126 within the open interior 118. By sliding the third magnet 136 away from the first joint 126, the size of the loop 113 is increased. By sliding the third magnet 136 closer to the first joint 126, the size of the loop 113 is decreased. The loop 113 allows for a loose, extension portion 117 to be formed between the second magnet 130 and the third magnet 136. As a result, the second magnet 130 has more flexibility as to what ferromagnetic surface it can be attached by allowing the hat 80 to hang lower. This also allows the second magnet 130 to be attached to the ferromagnetic surface 84 to hang the hat 80 thereto while avoiding the need to secure the first magnet 124 or the third magnet 136 to the ferromagnetic surface 84. A second loop may be formed by bending the flexible member 112 such that the second magnet 130 is also attached to the third magnet 136 to secure the anchoring device 110 to other support structures that may be non-ferromagnetic and/or non-metallic.

From the above, it is to be appreciated that defined herein is a magnetic anchoring device for securing an object to a support structure.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A magnetic anchoring device comprising:
   a flexible member having a first end, an opposite second end, a first surface, and an opposite second surface, the first end, the second end, the first surface, and the second surface defining an open interior;

a first magnet positioned within the open interior of the flexible member and proximate the first end; and a second magnet positioned within the open interior of the flexible member and proximate the second end.

2. The magnetic anchoring device of claim 1, wherein the first magnet is provided within a first pocket and the second magnet is provided within a second pocket spaced apart from the first pocket, the first pocket and the second pocket restricting movement of the first magnet and the second magnet, respectively.

3. The magnetic anchoring device of claim 1, wherein the first magnet and the second magnet each have a same shape.

4. The magnetic anchoring device of claim 3, wherein the first magnet and the second magnet each have a generally circular outer peripheral shape.

5. The magnetic anchoring device of claim 1, wherein the first magnet is attachable to the second magnet, and at least one of the first magnet and the second magnet are attachable to a ferromagnetic surface.

6. The magnetic anchoring device of claim 1 further comprising a third magnet positioned within the open interior of the flexible member between the first magnet and the second magnet.

7. The magnetic anchoring device of claim 6, wherein the third magnet is provided within a third pocket of the flexible member for restricting movement of the third magnet.

8. The magnetic anchoring device of claim 6, wherein the first magnet is attachable to the third magnet, and the second magnet is attachable to a ferromagnetic surface.

9. The magnetic anchoring device of claim 1, wherein the second magnet has an elongated shape having a length extending partially between the first end and the second end of the flexible member, and a width extending transverse to the length, the length of the second magnet being greater than the width of the second magnet.

10. The magnetic anchoring device of claim 9, wherein, when the first magnet contacts the second magnet, the first magnet is slidably adjustable along the length of the second magnet.

11. The magnetic anchoring device of claim 1, wherein the second magnet comprises a plurality of individual magnet segments.

12. The magnetic anchoring device of claim 11, wherein each of the individual magnet segments have a same shape.

13. A magnetic anchoring device comprising:

a flexible member having a first end, an opposite second end, a first surface, and an opposite second surface, the first end, the second end, the first surface, and the second surface defining an open interior;

a first magnet positioned within the open interior of the flexible member and proximate the first end; and a second magnet positioned within the open interior of the flexible member and proximate the second end, wherein the flexible member is positionable between a non-use position in which the first magnet is not magnetically attached to any portion of the flexible member, and a use position in which the first magnet is magnetically attached to a portion of the flexible member to create a loop.

14. The magnetic anchoring device of claim 13, wherein the first magnet is attachable to the second magnet, and at least one of the first magnet and the second magnet are attachable to a ferromagnetic surface.

15. The magnetic anchoring device of claim 14, wherein, when in the use position, the first magnet is magnetically attached to the second magnet, the loop defined by the flexible member being bent between the first magnet and the second magnet.

16. The magnetic anchoring device of claim 13 further comprising a third magnet positioned within the open interior of the flexible member between the first magnet and the second magnet.

17. The magnetic anchoring device of claim 16, wherein, when in the use position, the first magnet is magnetically attached to the third magnet, the loop defined by the flexible member being bent between the first magnet and the third magnet.

18. The magnetic anchoring device of claim 17, when in the use position, the second magnet is magnetically attached to the third magnet, a second loop defined by the flexible member being bent between the second magnet and the third magnet.

19. The magnetic anchoring device of claim 17, wherein a size of the loop is adjustable by moving the third magnet along the flexible member relative to the first magnet.

20. The magnetic anchoring device of claim 13, wherein the second magnet comprises a plurality of individual magnet segments.

* * * * *